(12) United States Patent
Rasmussen et al.

(10) Patent No.: US 7,422,295 B2
(45) Date of Patent: Sep. 9, 2008

(54) TRACTION LUGS FOR SNOWMOBILE DRIVE TRACK

(75) Inventors: Bret Rasmussen, Preston, ID (US); Jason Howell, Thief River Falls, MN (US); Mike Konickson, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 10/786,583

(22) Filed: Feb. 23, 2004

(65) Prior Publication Data

US 2004/0217648 A1 Nov. 4, 2004

Related U.S. Application Data

(60) Provisional application No. 60/449,792, filed on Feb. 24, 2003.

(51) Int. Cl.
*B62D 55/24* (2006.01)

(52) U.S. Cl. ............... 305/178; 305/165; 305/179

(58) Field of Classification Search ............ 305/160, 305/165, 178, 179, 180, 157, 158, 181, 182; 180/9.1; 440/12.56, 12.63, 12.64
See application file for complete search history.

(56) References Cited

U.S. PATENT DOCUMENTS

| | | | | |
|---|---|---|---|---|
| 2,680,421 A | * | 6/1954 | Baker | 440/96 |
| 2,705,470 A | * | 4/1955 | Baker et al. | 440/12.64 |
| 3,155,436 A | * | 11/1964 | Bonmartini | 305/115 |
| 3,278,244 A | | 10/1966 | Deffenbaugh et al. | |
| 3,477,768 A | | 11/1969 | Culver | |
| 3,785,420 A | * | 1/1974 | Bradley et al. | 411/188 |
| 3,830,551 A | * | 8/1974 | Masaoka et al. | 305/179 |
| 3,934,944 A | * | 1/1976 | Forsgren | 305/179 |
| 4,095,849 A | * | 6/1978 | Husted | 305/165 |
| 4,175,627 A | * | 11/1979 | Husted | 180/190 |
| 4,482,193 A | | 11/1984 | Boggs et al. | |
| 4,795,221 A | * | 1/1989 | Simmons | 305/180 |
| 4,938,546 A | * | 7/1990 | Simmons | 305/180 |
| 4,953,921 A | * | 9/1990 | Burns | 305/165 |
| 5,033,801 A | * | 7/1991 | Beeley | 305/180 |
| 5,730,510 A | * | 3/1998 | Courtemanche | 305/168 |
| 5,980,001 A | * | 11/1999 | Rubel | 305/180 |
| 6,065,818 A | * | 5/2000 | Fischer | 305/179 |
| 6,203,125 B1 | * | 3/2001 | Arakawa et al. | 305/166 |
| 6,540,310 B1 | * | 4/2003 | Cartwright | 305/180 |
| 6,609,771 B2 | * | 8/2003 | Morin et al. | 305/178 |

* cited by examiner

*Primary Examiner*—Russell D Stormer
(74) *Attorney, Agent, or Firm*—Black, Lowe & Graham PLLC (57) ABSTRACT

An endless drive track for a snowmobile is provided with traction lugs that are inclined relative to normal to the track base. When the traction lugs are inclined away from the direction of travel for the track, the traction lugs can compress the snow before engaging the snow for traction, thereby providing lift for a snowmobile traveling in deep snow.

9 Claims, 12 Drawing Sheets

TRACTION LUGS FOR SNOWMOBILE
DRIVE TRACK

BACKGROUND OF THE INVENTION

The present invention is directed to an endless drive track for a snowmobile. Typically, snowmobiles are driven by an endless track provided with traction lugs that engage the snow or ice over which the snowmobile travels. The traction lugs are oriented perpendicular to the base of the track.

SUMMARY OF THE INVENTION

The present invention provides an endless drive track in which the traction lugs are inclined relative to the normal to the track base. When the traction lugs are inclined away from the direction of travel of the track, the traction lugs can compress deep snow before gripping with the snow, which can provide the snowmobile with lift when traveling in deep snow. When the traction lugs are inclined in the direction of travel of the drive track, they can provide a more aggressive gripping of the surface on which the snowmobile is traveling, resulting in improved acceleration.

DETAILED DESCRIPTION

Figure 1:
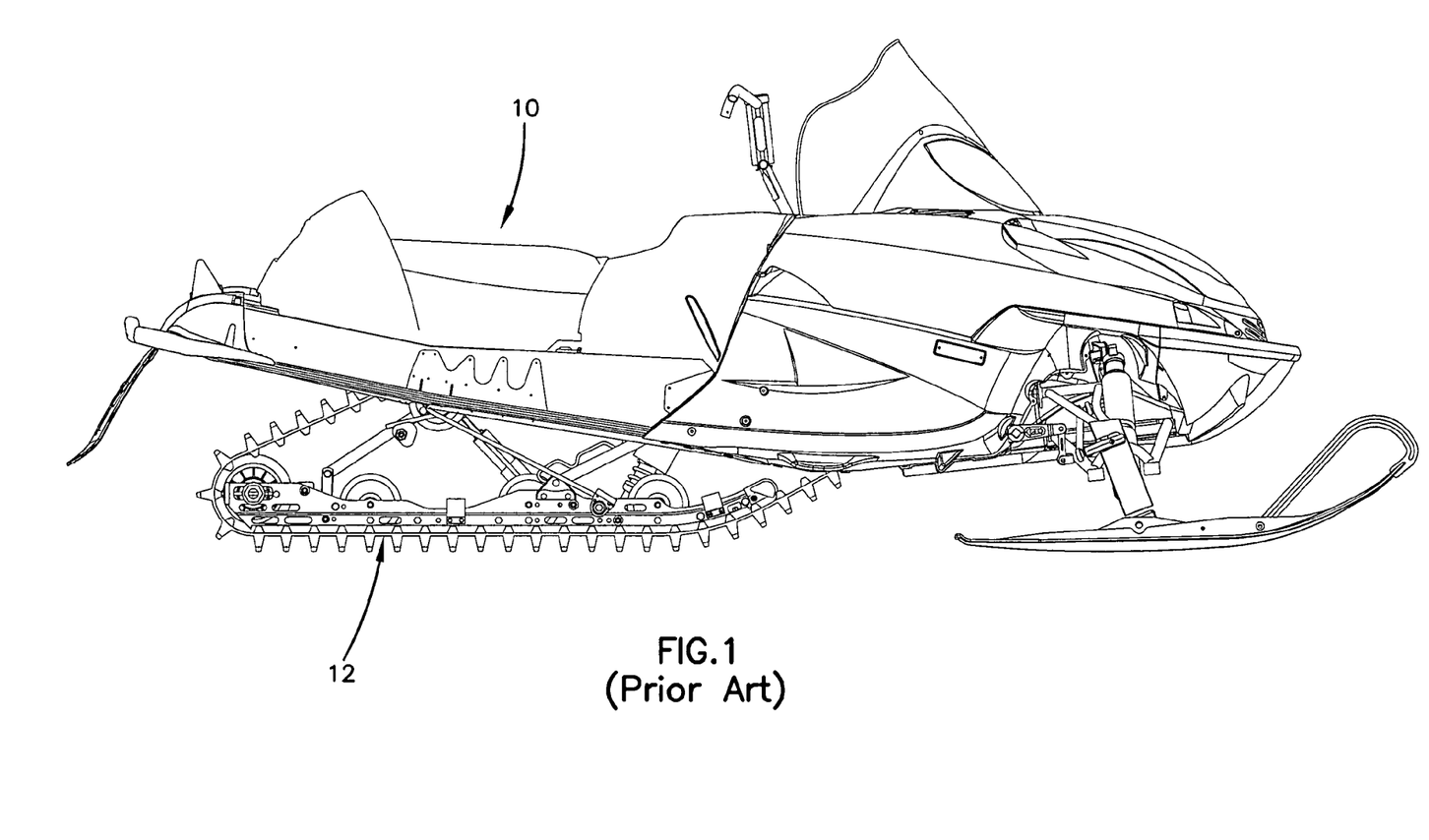
FIG. 1 is a side view of a snowmobile.

FIG. 1 shows a side view of a typical snowmobile 10. The drive system for the snowmobile includes an endless track 12, which passes around drive sprockets and idler wheels. The endless drive track 12 is provided with traction lugs that grip the surface over which the snowmobile travels. Thus, as the endless track is driven to rotate around the drive sprockets and idler wheels, the snowmobile moves forward or backward, depending on the direction of relative rotation between the drive track and the drive sprockets and idler wheels.

Figure 2:
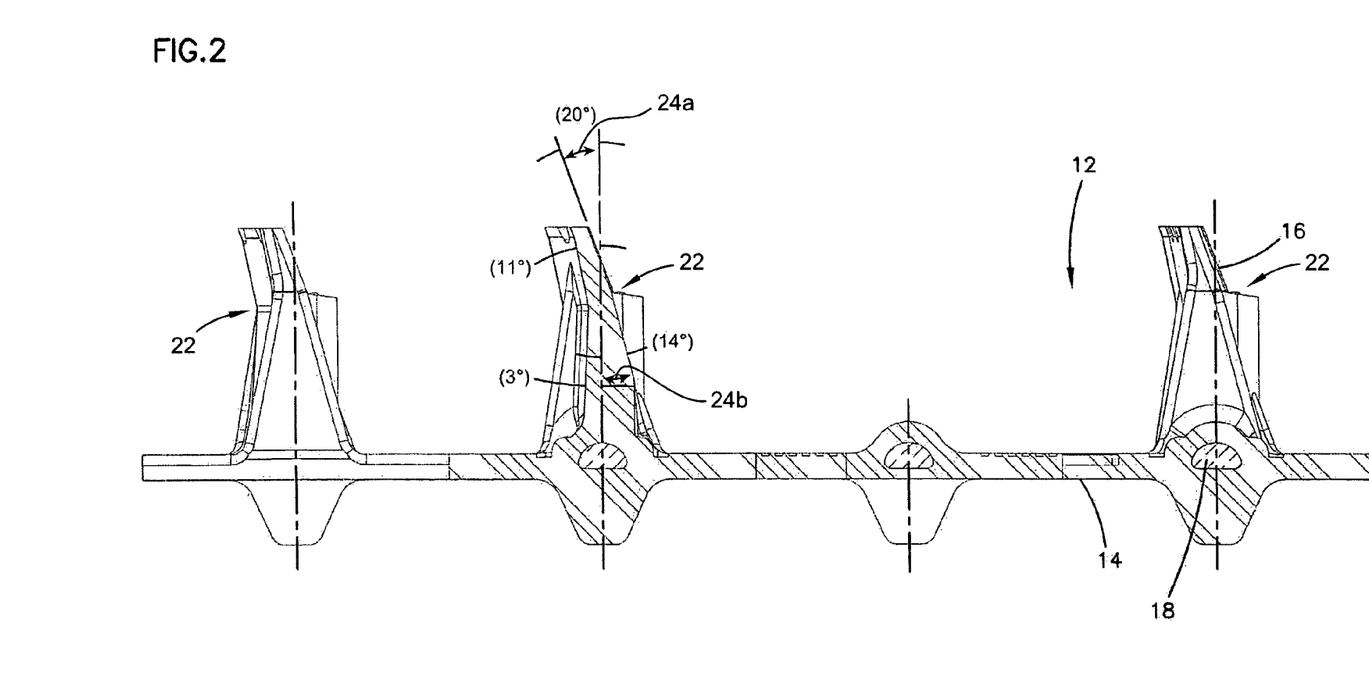
FIG. 2 is a sectional side view of a portion of an endless drive track for a snowmobile of the present invention.

Referring to FIG. 2, the endless drive track of the present invention includes a track base portion 14 and traction lugs 16. The base and traction lugs can be a unitary, molded one-piece construction. The endless drive track can be provided with a reinforcing bar 18, as is customary.

Figure 3:
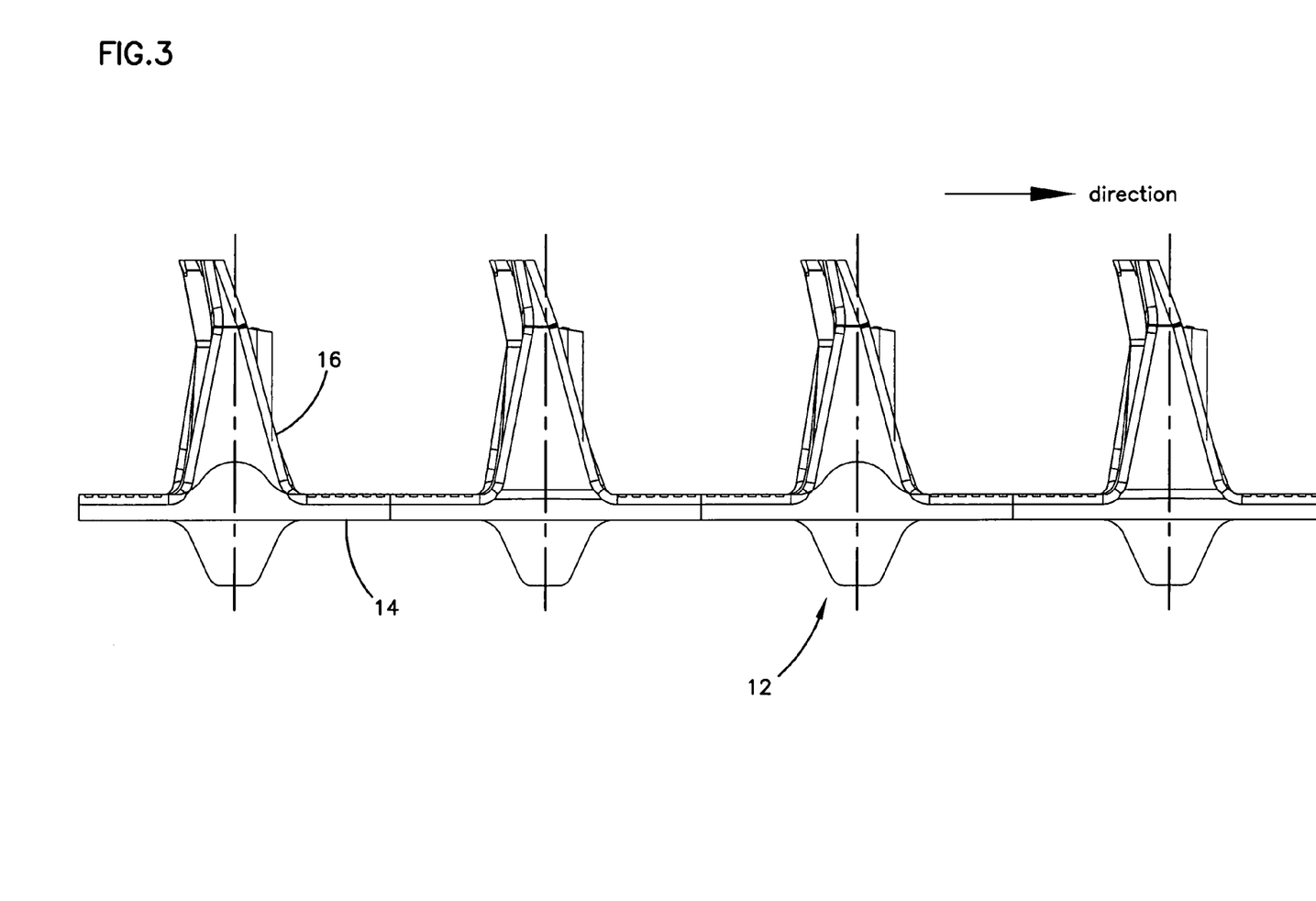
FIG. 3 is a side view of a further embodiment of a drive track for a snowmobile of the present invention.

As shown in FIGS. 2 and 3, the longitudinal thickness of each of lugs 16 at any point above the base is substantially less than the height of the lugs. The longitudinal thickness is the dimension in the longitudinal direction of track 12.

The traction lugs of the endless drive track of the present invention are inclined relative to the normal to the track base portion 14. For purposes of the present invention, the inclination of a traction lug is determined by considering a line drawn from the midpoint of the portion where the traction lug joins the track base portion to the midpoint of the tip portion of the traction lug, when viewed from the side. The term normal is referring to the geometric normal, i.e. a line extending perpendicularly from the track base when the track base is oriented in a horizontal plane. This is illustrated in FIG. 3.

In one aspect of the present invention, the traction lugs are inclined away from the travel direction of the endless drive track, as seen in FIG. 3. For the purposes of the present application, the direction of travel is considered the direction in which the drive track moves relative to the drive sprocket and idler wheels when a snowmobile is moving forward. Thus, for example, in FIG. 1, the direction of travel for the drive track would be in the clockwise direction.

Figure 4A:
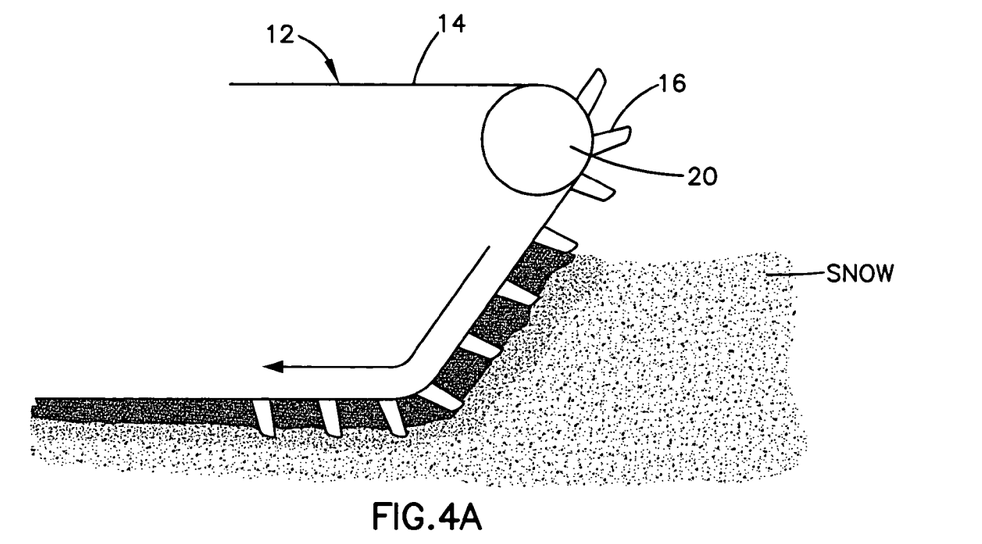
FIGS. 4A-B are side views illustrating the operation of a snowmobile with a drive track of the present invention and that of the prior art.
Figure 4B:
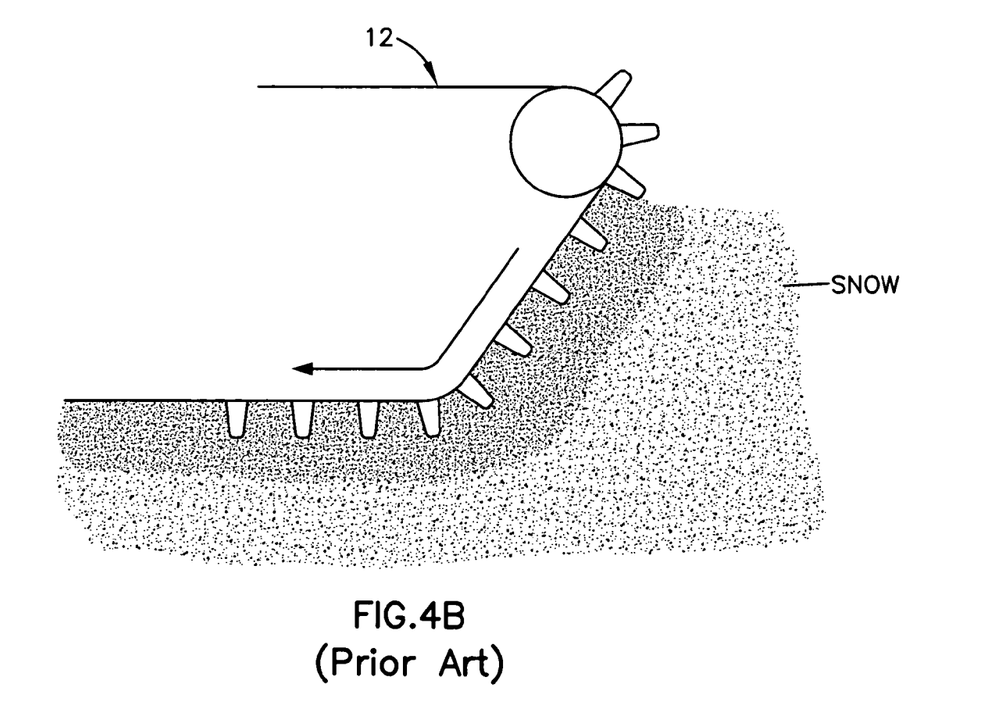

When the traction lugs are inclined away from the direction of travel for the endless track, the traction lugs may have the function of compressing snow on which the snowmobile is traveling before gripping and engaging the snow. That is, the traction lug will compress the snow as well as scoop the snow. This can be advantageous in providing the snowmobile with lift when traveling in deep snow. Referring to FIGS. 4A and B, the compression action will be described in more detail. As seen conceptually in FIG. 4A, as the drive track comes around the drive sprockets 20, the traction lugs will come into contact with the top of the snow. The inclined traction lugs of the present invention allow the snow to be pressed downwardly toward the bottom of the track. That is, the contact surface with the snow is more horizontal, improving the transport of the snow to the bottom of the track. This action tends to pack the snow down, with the track lifting itself, and thus the snowmobile, over the packed snow. The compressed snow also provides improved traction for the traction lugs. These effects are especially significant in deep snow. In contrast, the perpendicularly oriented traction lugs in FIG. 4B tend to shear the snow, causing it to crumble and disperse. Thus there is less packing of the snow, and there is more of a tendency for the traction lugs to dig out the snow, causing the snowmobile to tend to sink.

The angle of inclination of the traction lug should be sufficient to provide the compressing action, but not so great as to reduce the traction function significantly. Typically, the angle of inclination of the traction lug will be in the range of 5 to 45 degrees, preferably 5 to 30 degrees, more preferably 5 to 15 degrees. It also is possible to consider the inclination of the leading face of the traction lug. It is preferred that the upper part of the leading face of the traction lug have an inclination of at least 5 degrees, preferably at least 10 degrees, and more preferably at least 15 degrees relative to the normal to the base portion. The traction lugs generally will have a height of about 0.5 to 3 inches (1 to 8 cm), preferably about 1.5 to 3 inches (3 to 8 cm).

The leading and trailing faces of the traction lugs can be parallel or, as illustrated in FIG. 2, they can have different angles of inclination. In the example illustrated in FIG. 2, the leading face is inclined at an angle of about 15 degrees while the trailing face is inclined at an angle of about 5 degrees. Also, as illustrated in FIG. 2, the inclination of the face need not be constant over its height. For example, the angle of inclination of the face can increase toward the tip of the traction lug. The inclined face of the traction lug may have a point of inflection 22, that is a point where the angle of inclination changes, above or below a midpoint of the height of the traction lug. There may be two or more different inclination angles 24a, 24b on the face of the traction lug.

It is not necessary for the trailing face of the traction lug to be inclined in the same direction as the forward face. The trailing face could be oriented perpendicular to the base portion of the track, or as illustrated in FIG. 3, could be inclined at least partly in a direction opposite to the inclination of the leading face. As long as the leading face is inclined sufficiently in the direction opposite to the direction of travel, the desired effect of compressing snow can be achieved.

Figure 5:
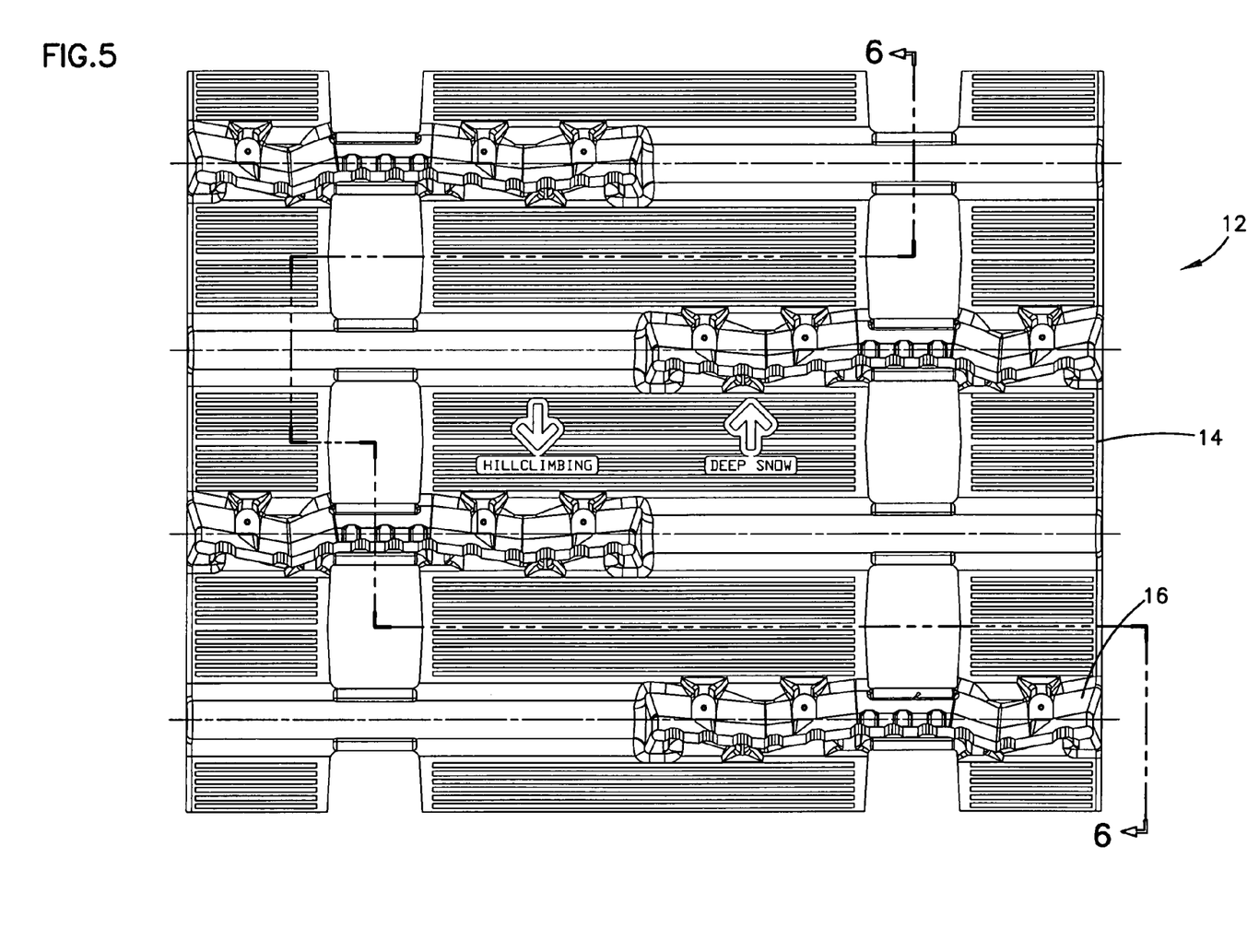
FIG. 5 is a plan view of a further embodiment of a drive track for a snowmobile of the present invention.
Figure 6:
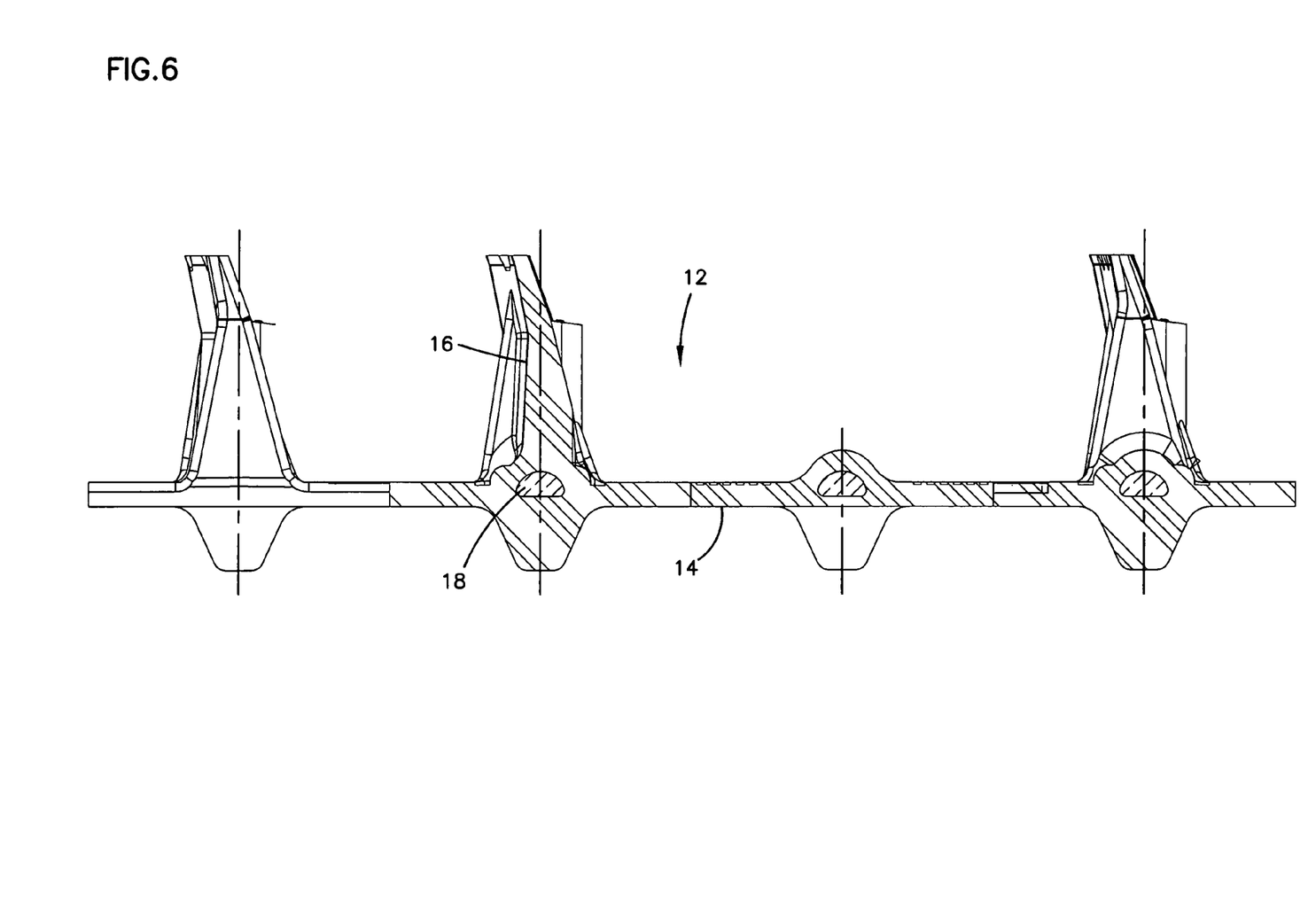
FIG. 6 is a partly sectional side view taken along line 6-6 in FIG. 5.
Figure 7:
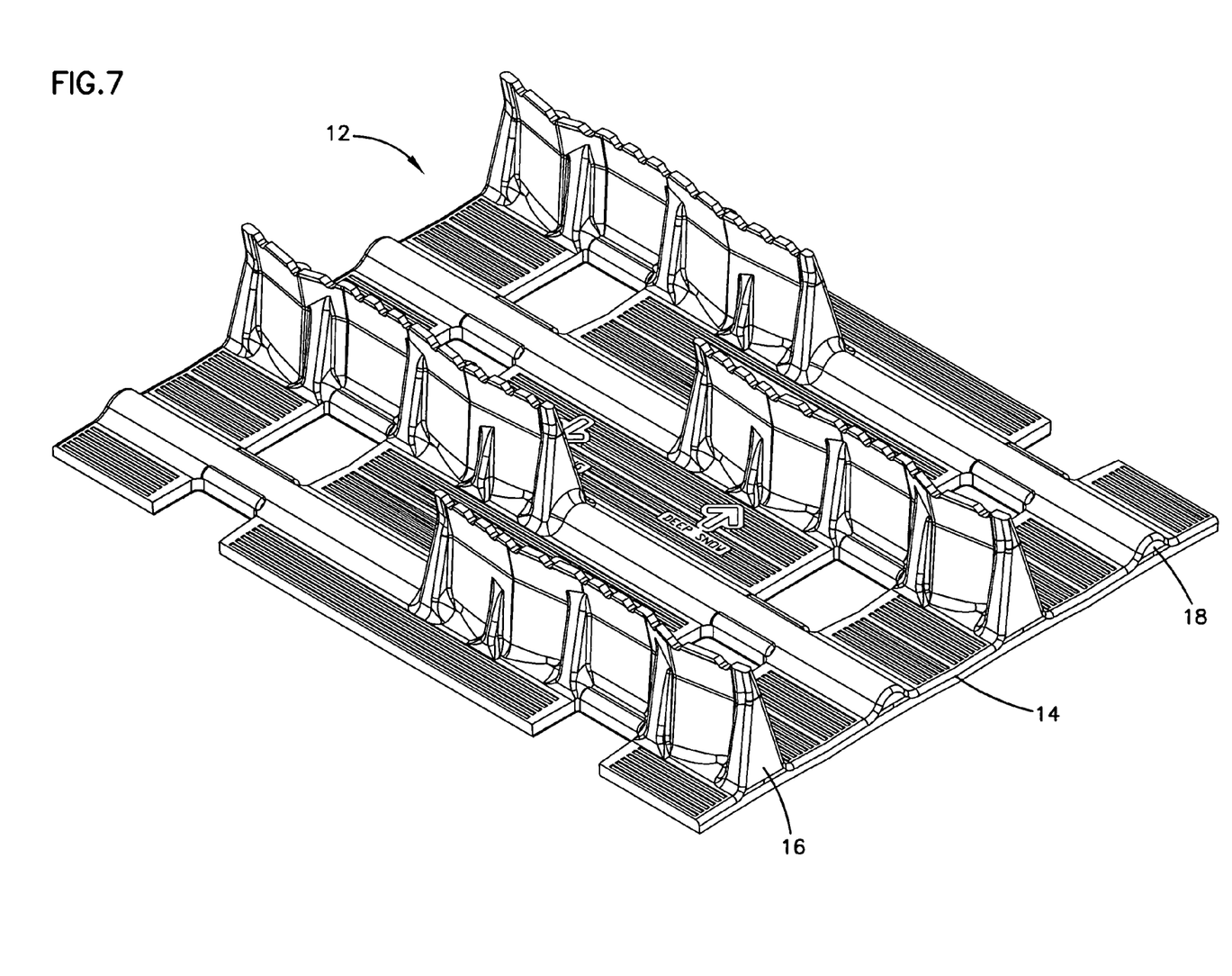
FIGS. 7 and 8 are perspective views of the drive track for a snowmobile of the embodiment of FIG. 5.
Figure 8:
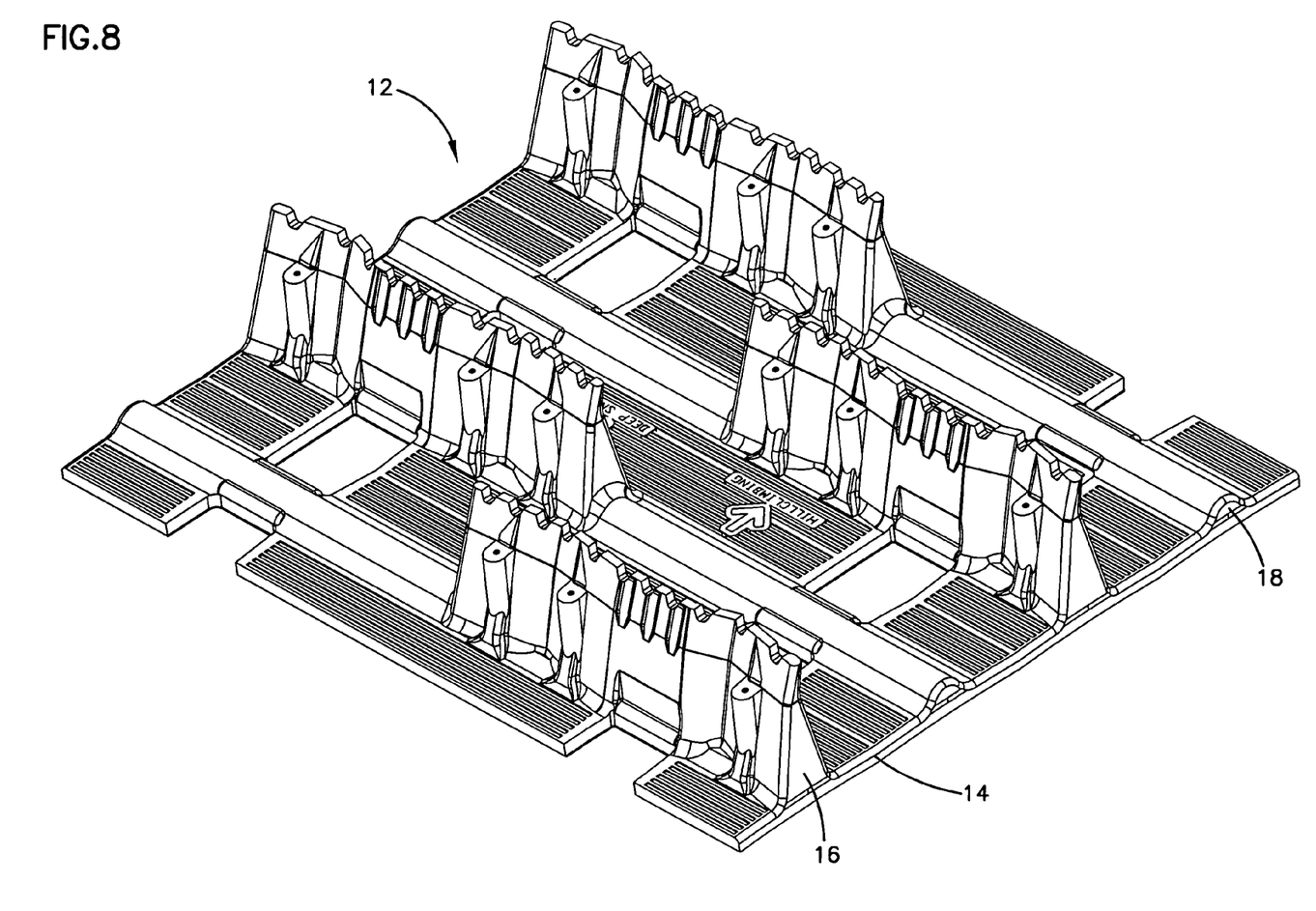
Figure 9:
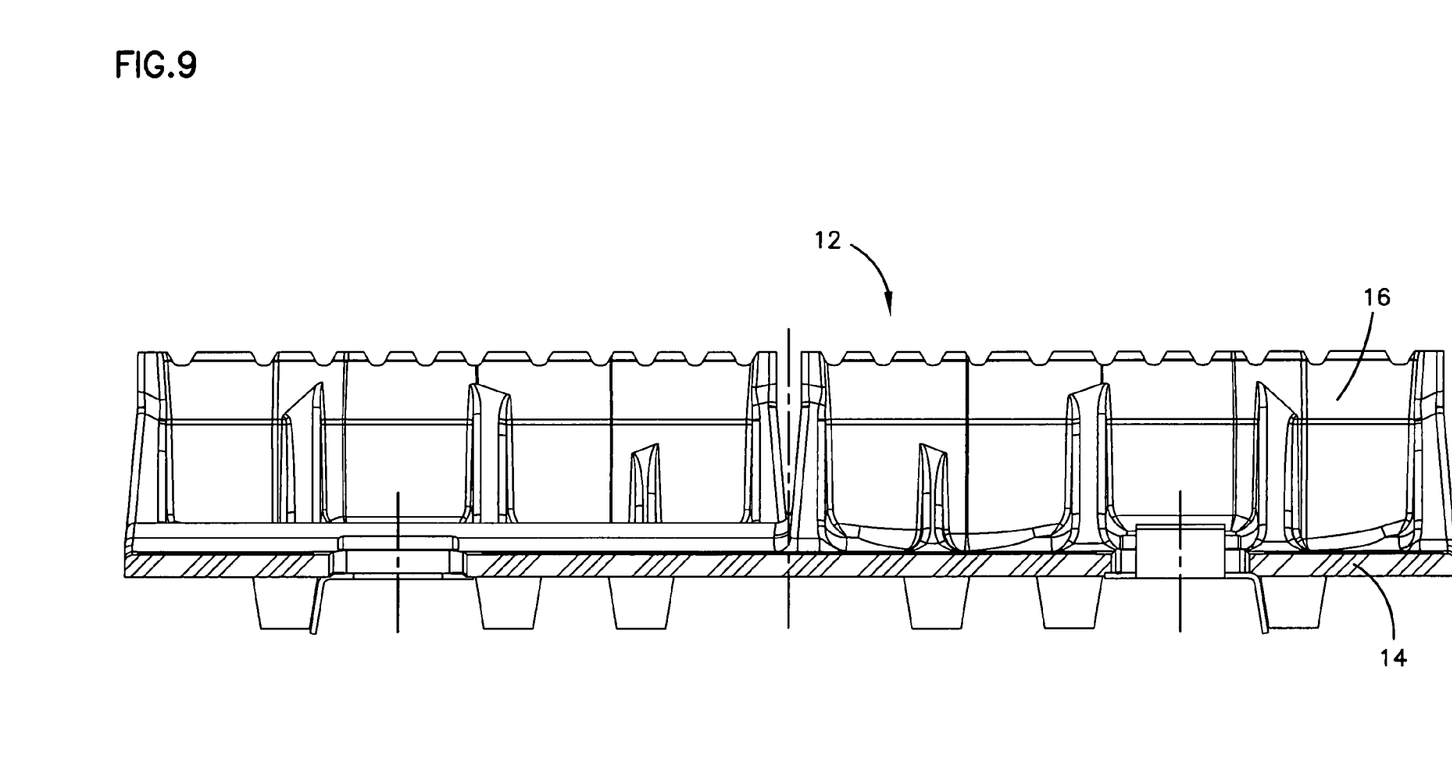
FIG. 9 is a sectional lateral view of the drive track for a snowmobile of the embodiment of FIG. 5.

Referring to FIGS. 5-9, it can be seen that the traction lugs can be provided in a staggered relationship on the track. The upper edge of the tip of the traction lug can be provided with indented portions, e.g. scallop-like cutouts. The traction lugs can be formed to extend in a straight line across the track. Alternatively, as seen in FIGS. 5, 7 and 8, the traction lugs can be formed into a shape with undulations instead of a straight line.

Figure 10:
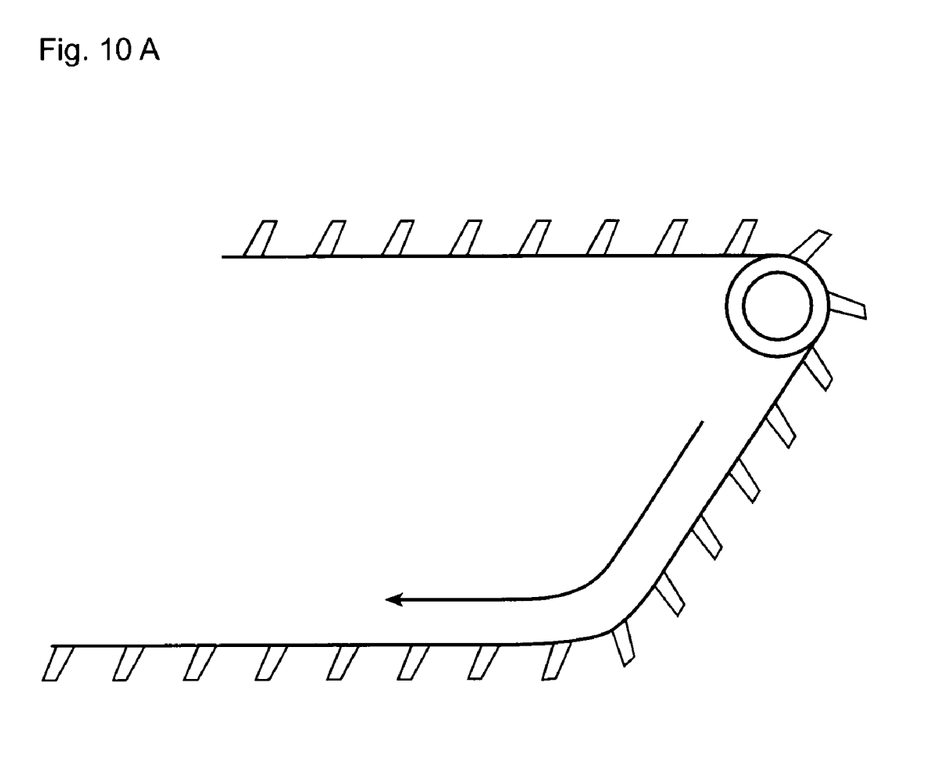
FIGS. 10A and 10B are side views illustrating alternative embodiments of a drive track with inclined traction lugs.

In another aspect of the present invention, the traction lugs are inclined toward the direction of travel as shown in FIG. 10A. This can provide a more aggressive grip of the surface on which the snowmobile is traveling. This can provide advantages in acceleration and hill climbing.

It is possible to provide the track with some traction lugs that are inclined away from the direction of travel and some that are inclined toward the direction of travel as shown in FIG. 10B. In one example, the traction lugs inclined in different directions would be arranged as alternating rows, with each row having traction lugs inclined in the same direction as shown in FIG. 10B. In another example, traction lugs with different directions of inclination would be included in the same row as shown in FIG. 10C.

The track may bear instructive indicia. For example an indicia reading "deep snow" having an arrow pointing in a first direction opposite the angle of inclination of the lugs may be provided. An indicia reading "hill climbing" having an arrow pointing in the same direction as the angle of inclination of the lugs may also be provided. As discussed previously, tracks having the angle of inclination pointing in the direction of travel of the lugs are suitable for hill climbing.

The traction lugs can be provided at intervals across the width of the endless drive track in the usual manner. The traction lugs can be spaced in the longitudinal direction of the drive track in the usual manner. The endless drive track can be made of known elastomeric and composite materials.

A detailed description of the invention has been provided above, but the present invention is not limited thereto. Modifications not departing from the spirit of the invention will be apparent. The invention is defined by the claims that follow.

What is claimed is:

1. An endless drive track for a snowmobile,
comprising a base and traction lugs integrally formed with the base, the traction lugs extending upward from the base and extending across a width of the base,
wherein the traction lugs are inclined relative to normal to the base and wherein the traction lugs comprise a first set of traction lugs inclined away from a track travel direction and a second set of traction lugs inclined toward a track travel direction.

2. An endless drive track for a snowmobile, the track having an outer periphery comprising:
a base including an outer side; and
a plurality of traction lugs formed with the base in a unitary construction and extending across a width of the base, each lug having a lower portion proximate and extending outward from the outer side of the base by a first angle of inclination, and at least some of the lugs having an upper portion extending from the lower portion by second angle of inclination relative to the direction perpendicular to the outer side of the base, the second angle of inclination being greater than the first angle of inclination.
wherein the first angle of inclination is in the range from 5 to 45 degrees.

3. The endless drive track of claim 2, wherein the first angle of inclination is in the range from 5 to 30 degrees.

4. The endless drive track of claim 2, wherein the first angle of inclination is in the range from 5 to 15 degrees.

5. The endless drive track of claim 2, further comprising an inflection point between the upper portion and the lower portion of at least some of the lugs.

6. An endless drive track for a snowmobile, the track having an outer periphery, the track comprising:
a base including an outer side; and
traction lugs extending outward from the outer side of the base, the lugs comprising a lower portion having a first angle of inclination relative to normal to the base and an upper portion having a second angle of inclination relative to normal to the base, the second angle being greater than the first angle;
wherein the lower portion has a first leading face having a first leading face angle and the upper portion has a second leading face having a second leading face angle, the first leading face angle being about 14 degrees and the second leading face angle being about 20 degrees.

7. An endless drive track for a snowmobile, the track having an outer periphery, the track comprising:
a base including an outer side; and
traction lugs extending outward from the outer side of the base, the lugs comprising a lower portion having a first angle of inclination relative to normal to the base and an upper portion having a second angle of inclination relative to normal to the base, the second angle being greater than the first angle;
wherein the lower portion has a trailing face having a first trailing face angle and wherein the upper portion has a trailing face having a second trailing face angle, the first trailing face angle being about equal to 3 degrees and the second trailing face angle being about equal to 11 degrees.

8. A method for using an endless track, the method comprising:
providing a snowmobile;
providing a track comprising
a base; and
traction lugs integrally formed with the base, the traction lugs extending upward from the base and extending at intervals across a width of the base, the traction lugs being inclined relative to normal to the base;
selectively securing the track to the snowmobile with one of having the traction lugs inclined toward a track direction of travel and having the traction lugs inclined away from the track direction of travel; and
securing the track to the snowmobile with the traction lugs inclined opposite the previous securement.

9. The method of claim 8, wherein the track bears indicia indicating orientations of the traction lugs suitable for hill climbing and deep snow; the selected track lug orientation being based on the intended use of the track in conjunction with the indicia formed on the track.

* * * * *